(12) United States Patent
Yang

(10) Patent No.: US 10,882,463 B2
(45) Date of Patent: Jan. 5, 2021

(54) ARTICULATED FULL-AUTOMATIC ROTARY CLAMPING HOLDER

(71) Applicant: Shenzhen Annaijia Electronics Co., Ltd., Guangdong (CN)

(72) Inventor: Weiyu Yang, Shenzhen (CN)

(73) Assignee: SHENZHEN ANNAIJIA ELECTRONICS CO., LTD., Guangdong (CN)

( * ) Notice: Subject to any disclaimer, the term of this patent is extended or adjusted under 35 U.S.C. 154(b) by 379 days.

(21) Appl. No.: 15/771,400

(22) PCT Filed: Nov. 27, 2017

(86) PCT No.: PCT/CN2017/113024
§ 371 (c)(1),
(2) Date: Apr. 26, 2018

(87) PCT Pub. No.: WO2018/009340
PCT Pub. Date: Jun. 7, 2018

(65) Prior Publication Data
US 2020/0282920 A1    Sep. 10, 2020

(30) Foreign Application Priority Data
Nov. 30, 2016 (CN) .................... 2016 2 1300319 U

(51) Int. Cl.
*B60R 11/02* (2006.01)
*F16B 2/10* (2006.01)
*B60R 11/00* (2006.01)

(52) U.S. Cl.
CPC ............ *B60R 11/0241* (2013.01); *F16B 2/10* (2013.01); *B60R 2011/0071* (2013.01)

(58) Field of Classification Search
CPC ......... B60R 11/0241; B60R 2011/0071; F16B 2/10; H04M 1/04; F16M 11/04
See application file for complete search history.

(56) References Cited

U.S. PATENT DOCUMENTS

| 7,920,905 | B2 * | 4/2011 | Bury | B60R 11/0241 |
| | | | | 379/445 |
| 8,627,953 | B1 * | 1/2014 | Yeo | H04B 1/3888 |
| | | | | 206/320 |
| 8,752,802 | B1 * | 6/2014 | Fan | H04M 1/04 |
| | | | | 248/309.1 |
| 9,749,002 | B1 * | 8/2017 | Fan | H04M 1/04 |
| 10,207,652 | B2 * | 2/2019 | Yu | B60R 11/0241 |
| 10,533,699 | B2 * | 1/2020 | Yang | F16M 13/00 |
| 10,598,199 | B1 * | 3/2020 | Fan | B60R 11/02 |
| 10,663,104 | B2 * | 5/2020 | Yang | F16M 13/022 |
| 10,673,999 | B2 * | 6/2020 | Yang | F16M 11/041 |
| 2012/0025036 | A1 * | 2/2012 | Huang | F16M 11/041 |
| | | | | 248/122.1 |

(Continued)

Primary Examiner — Anita M King
(74) Attorney, Agent, or Firm — Leong C. Lei

(57) ABSTRACT

An articulated full-automatic rotary clamping holder includes a rear base, a bottom support arm, a left holding arm and a right holding arm. The rear base is fixedly connected with a return elastic member extending vertically for returning the bottom support arm upward. One end of the return elastic member is fixed to the rear base. Another end of the return elastic member is connected to the bottom support arm.

10 Claims, 7 Drawing Sheets

(56) References Cited

U.S. PATENT DOCUMENTS

| | | | |
|---|---|---|---|
| 2012/0312936 A1* | 12/2012 | Huang | F16M 13/00 |
| | | | 248/122.1 |
| 2013/0277520 A1* | 10/2013 | Funk | G06F 1/1626 |
| | | | 248/274.1 |
| 2018/0043840 A1* | 2/2018 | Minn | B60R 11/02 |
| 2019/0186679 A1* | 6/2019 | He | F16M 13/00 |
| 2020/0191178 A1* | 6/2020 | Yang | F16B 2/02 |

* cited by examiner

ARTICULATED FULL-AUTOMATIC ROTARY CLAMPING HOLDER

BACKGROUND OF THE INVENTION

1. Field of the Invention

The present invention relates to a holder used for a mobile device, such as a mobile phone, and more particularly to an articulated full-automatic rotary clamping holder.

2. Description of the Prior Art

These days, with the popularity of mobile phones and other mobile devices, mobile phone holders have been widely used. Most of conventional mobile phone holders are operated manually for clamping a mobile phone. Some of the mobile phone holders have an automatic clamping design which is provided with a pressure sensor to detect whether or not a mobile phone is placed. A microcontroller according to the detected rotational state of the mobile phone controls an electric driver to achieve an automatic clamping function. This holder has deficiencies of a complex structure, high production cost, high power consumption, high failure rate, poor stability of use, and so on, so it is not suitable for popularization and application.

Accordingly, the inventor of the present invention has devoted himself based on his many years of practical experiences to solve these problems.

SUMMARY OF THE INVENTION

In view of the shortcomings of the prior art, the primary object of the present invention is to provide an articulated full-automatic rotary clamping holder. By taking advantage of the weight of a mobile phone to move a bottom support arm downward, left and right holding arms are rotated inward to clamp the mobile phone tightly. The clamping holder has a simple structure and a stable and reliable linkage, and is practical, easy to produce, and suitable for popularization and application.

In order to achieve the aforesaid object, the articulated full-automatic rotary clamping holder of the present invention comprises a rear base, a bottom support arm, a left holding arm, and a right holding arm. The bottom support arm, the left holding arm and the right holding arm are mounted to the rear base. The rear base is fixedly connected with a return elastic member extending vertically for returning the bottom support arm upward. One end of the return elastic member is fixed to the rear base. Another end of the return elastic member is connected to the bottom support arm.

The bottom support arm is provided with left and right rotation fulcrums corresponding to the left holding arm and the right holding arm. The left holding arm and the right holding arm are formed with link points connected with the bottom support arm and driven by the bottom support arm. The left holding arm and the right holding arm have holding portions extending beyond the rear base. The left and right rotation fulcrums are located between the corresponding holding portions and the link points. When the bottom support arm is moved downward, the bottom support arm drives the holding portions to rotate inward to form an automatic clamping. When the bottom support arm is returned upward, the bottom support arm drives the holding portions to rotate outward to form an automatic release.

Preferably, the link points of the left holding arm and the right holding arm are overlapped. The bottom support arm is connected with a movable pivot shaft. The link points of the left holding arm and the right holding arm are first pivot holes. The movable pivot shaft is inserted through the first pivot holes.

Preferably, the left and right rotation fulcrums are fixed pivot shafts protruding forward from the rear base. The left holding arm and the right holding arm are formed with corresponding second pivot holes. The fixed pivot shafts are inserted in the corresponding second pivot holes.

Preferably, left and right sides of the bottom support arm are respectively connected with oblique tension springs extending toward the link points of the left holding arm and the right holding arm. Upper ends of the oblique tension springs are connected to the corresponding link points, respectively.

Preferably, the left holding arm and the right holding arm are respectively provided with gears to mesh with each other. The gears are located at inner sides of the link points of the left holding arm and the right holding arm.

Preferably, the return elastic member is a pressure elastic member. A lower end of the pressure elastic member is connected to the rear base. An upper end of the pressure elastic member is connected to or leans against the bottom support arm.

Preferably, the bottom support arm is provided with a vertical receiving groove. A top of the receiving groove is connected with a mounting post extending downward. The pressure elastic member is a pressure spring. The pressure spring is fitted on the mounting post. The rear base is provided with a guide post protruding forward. The guide post extends into the receiving groove.

Preferably, the return elastic member is one of a tension spring, an elastic rubber band and an elastic rubber strap. An upper end of the return elastic member is connected to the rear base. A lower end of the return elastic member is connected to the bottom support arm.

Preferably, a front of the rear base is provided with a front cover. An accommodation room is formed between the front cover and the rear base. The left holding arm, the right holding arm, the bottom support arm and the return elastic member are located in the accommodation room. A bottom, a left side and a right side of the accommodation room have openings, respectively. A left end of the left holding arm, a right end of the right holding arm and a bottom end of the bottom support arm extend outward from the respective openings. The openings at the left and right sides of the accommodation room each have an upper limit surface and a lower limit surface for limiting displacement of the left holding arm and the right holding arm.

Preferably, a back of the rear base is provided with a mounting seat for mounting the full-automatic rotary clamping holder.

Compared with the prior art, the present invention has obvious advantages and beneficial effects. Specifically, it can be seen from the above technical solution that through the arrangement of the return elastic element, the link points of the left and right holding arms and the rotation fulcrums, when the bottom support arm is moved downward by means of the weight of the mobile phone, the left and right holding arms are driven to rotate inward to form an automatic clamping. When the mobile phone is taken out, the return force of the return elastic member makes the bottom support arm move upward. The bottom support arm drives the left and right holding arms to rotate outward to form an automatic release. The clamping holder is especially suitable for automotive applications, user-friendly operation, easy to use, and practical. The clamping holder has a simple structure and a stable and reliable linkage, and is easy to produce and suitable for popularization and application.

In order to more clearly describe the structural features, technical means, and specific objects and functions achieved by the present invention, the following further describes the present invention in detail with reference to the accompanying drawings and specific embodiments.

DETAILED DESCRIPTION OF THE PREFERRED EMBODIMENTS

FIGS. 1-7 illustrate a specific structure in accordance with an embodiment of the present invention. The full-automatic clamping holder is mainly used in a vehicle-mounted occasion, but not limited thereto. The full-automatic rotary clamping holder comprises a rear base 10, a bottom support arm 20, a left holding arm 30, and a right holding arm 40. The bottom support arm 20, the left holding arm 30 and the right holding arm 40 are mounted to the rear base 10. The bottom support arm 20 is connected with a support portion for supporting a mobile device.

Figure 6:
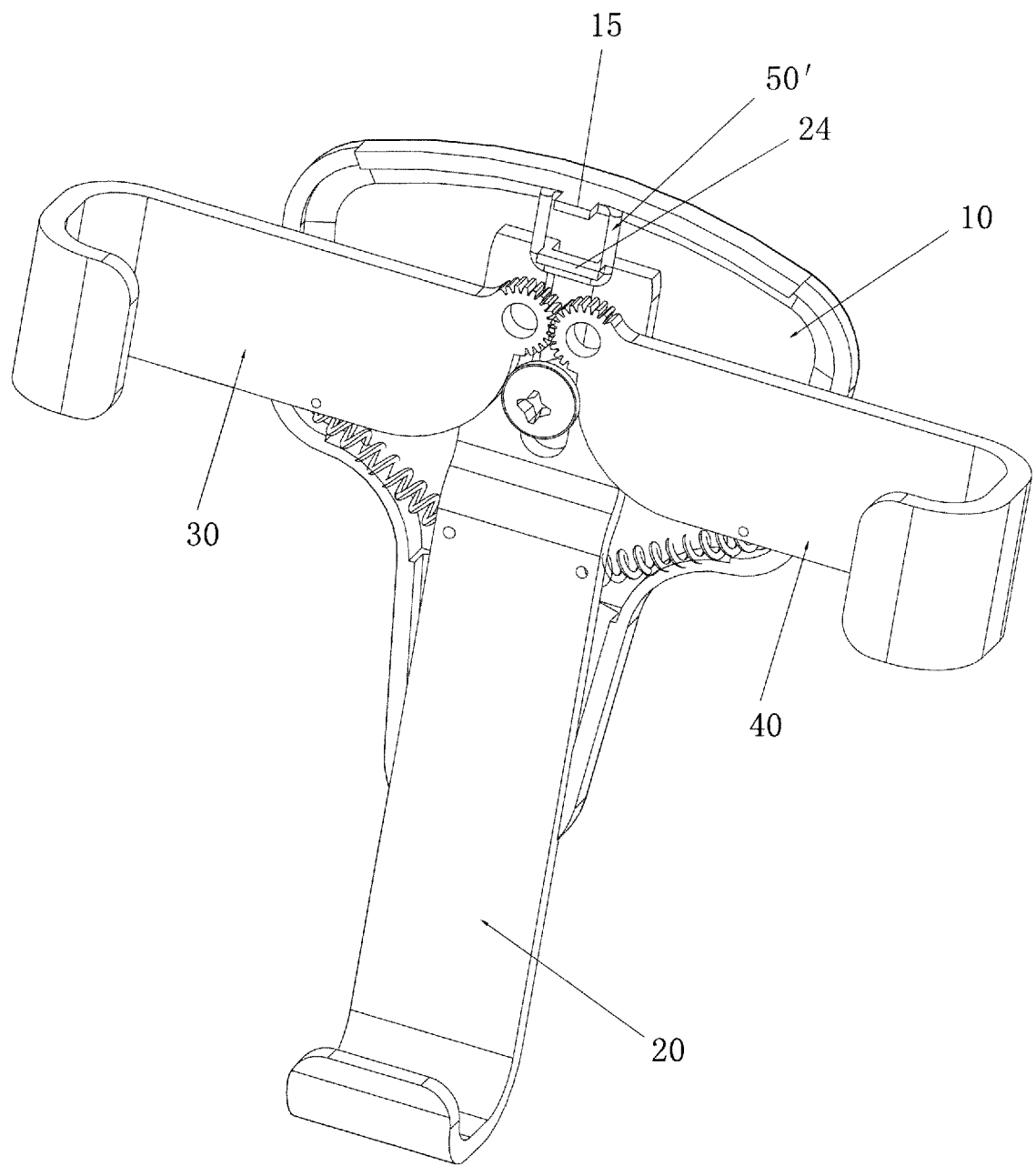
FIG. 6 is a schematic view of the present invention, showing that the return elastic member is an elastic rubber band.
Figure 7:
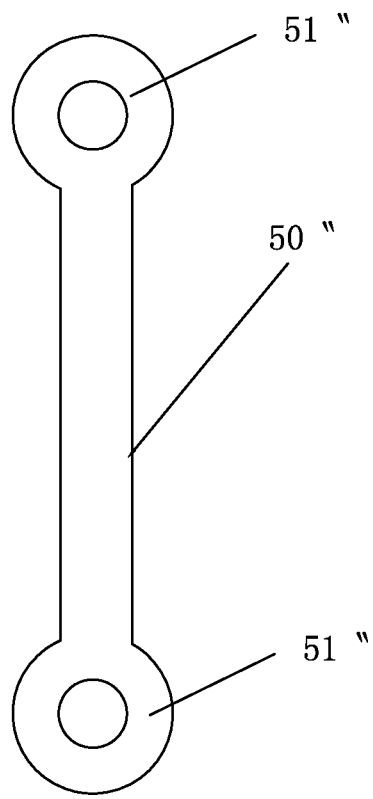
FIG. 7 is a schematic view of the present invention, showing that the return elastic member is an elastic rubber strap.

The rear base 10 is fixedly connected with a return elastic member 50 extending vertically for returning the bottom support arm 20 upward. One end of the return elastic member 50 is fixed to the rear base 10. Another end of the return elastic member 50 is connected to the bottom support arm 20. The return elastic member 50 may be a pressure elastic member or a tension elastic member, but not limited to a conventional pressure spring and a tension spring. It may be any elastic member able to return upward when the weight of a mobile device is released. In case the return elastic member 50 is a pressure elastic member, it is preferably a pressure spring. A lower end of the pressure spring is connected to the rear base 10, and an upper end of the pressure spring is connected to or leans against the bottom support arm 20. In this embodiment, the bottom support arm 20 is provided with a vertical receiving groove 21. A top of the receiving groove 21 is connected with a mounting post 22 extending downward. The pressure spring is fitted on the outer circumference of the mounting post 22. The rear base 10 is provided with a guide post 11 protruding forward. The guide post 11 extends into the receiving groove 21 to ensure a precise vertical movement of the bottom support arm 20. In case the return elastic member 50 is a tension elastic member, it is preferably a tension spring. The return elastic member 50 may be an elastic rubber band or an elastic rubber strap according to the demand. An upper end of the tension elastic member is connected to the rear base 10, and a lower end of the tension elastic member is connected to the bottom support arm 20. As shown in FIG. 6, an elastic rubber band 50' may be directly fitted on an upper positioning post 15 of the rear base 10 and a lower positioning post 24 of the bottom support arm 20. As shown in FIG. 7, the return elastic member may be an elastic rubber strap 50". The elastic rubber strap 50" has annular portions 51" at two ends thereof. The annular portions 51" are fitted on the corresponding upper positioning post 15 and the lower positioning post 24, respectively. The return elastic member referred to herein is not limited to the illustrated pressure spring, the tension spring, the elastic rubber band, and the elastic rubber strap. It may be other different suitable return elastic members.

The bottom support arm 20 is provided with left and right rotation fulcrums 101 corresponding to the left holding arm 30 and the right holding arm 40. The left holding arm 30 and the right holding arm 40 are formed with link points 102 connected with the bottom support arm 20 and driven by the bottom support arm 20. The left holding arm 30 and the right holding arm 40 have holding portions 103 extending beyond the rear base 10. The left and right rotation fulcrums 101 are located between the corresponding holding portions 103 and the link points 102. When a mobile phone 80 is placed, the bottom support arm 20 is pressed and moved downward by the weight of the mobile phone 80, the bottom support arm 20 drives the holding portions 103 to rotate inward to form an automatic clamping. When the bottom support arm 20 is returned upward, the bottom support arm 20 drives the holding portions 103 to rotate outward to form an automatic release.

Figure 3:
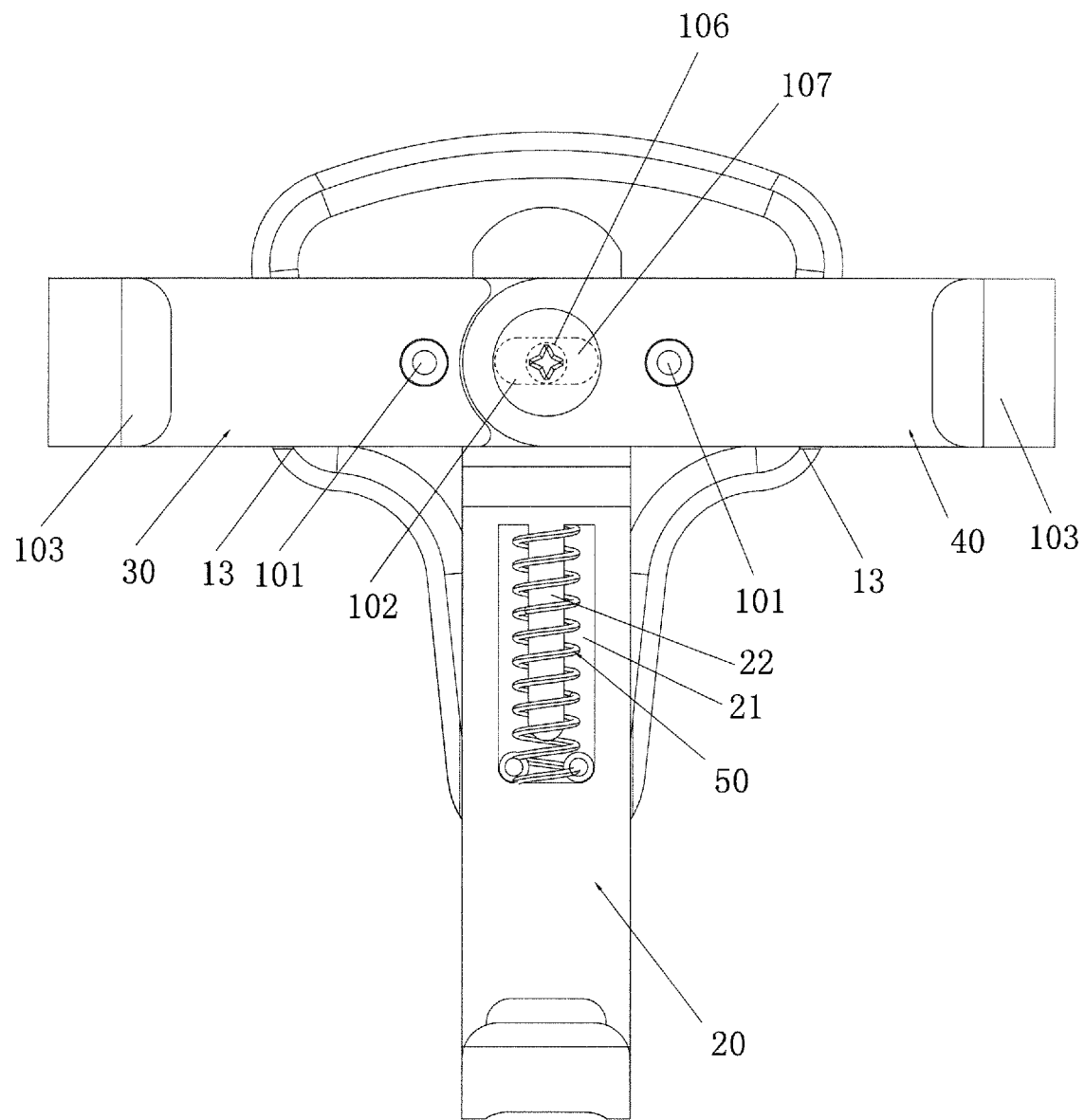
FIG. 3 is a partial schematic view according to the first embodiment of the present invention.
Figure 4:
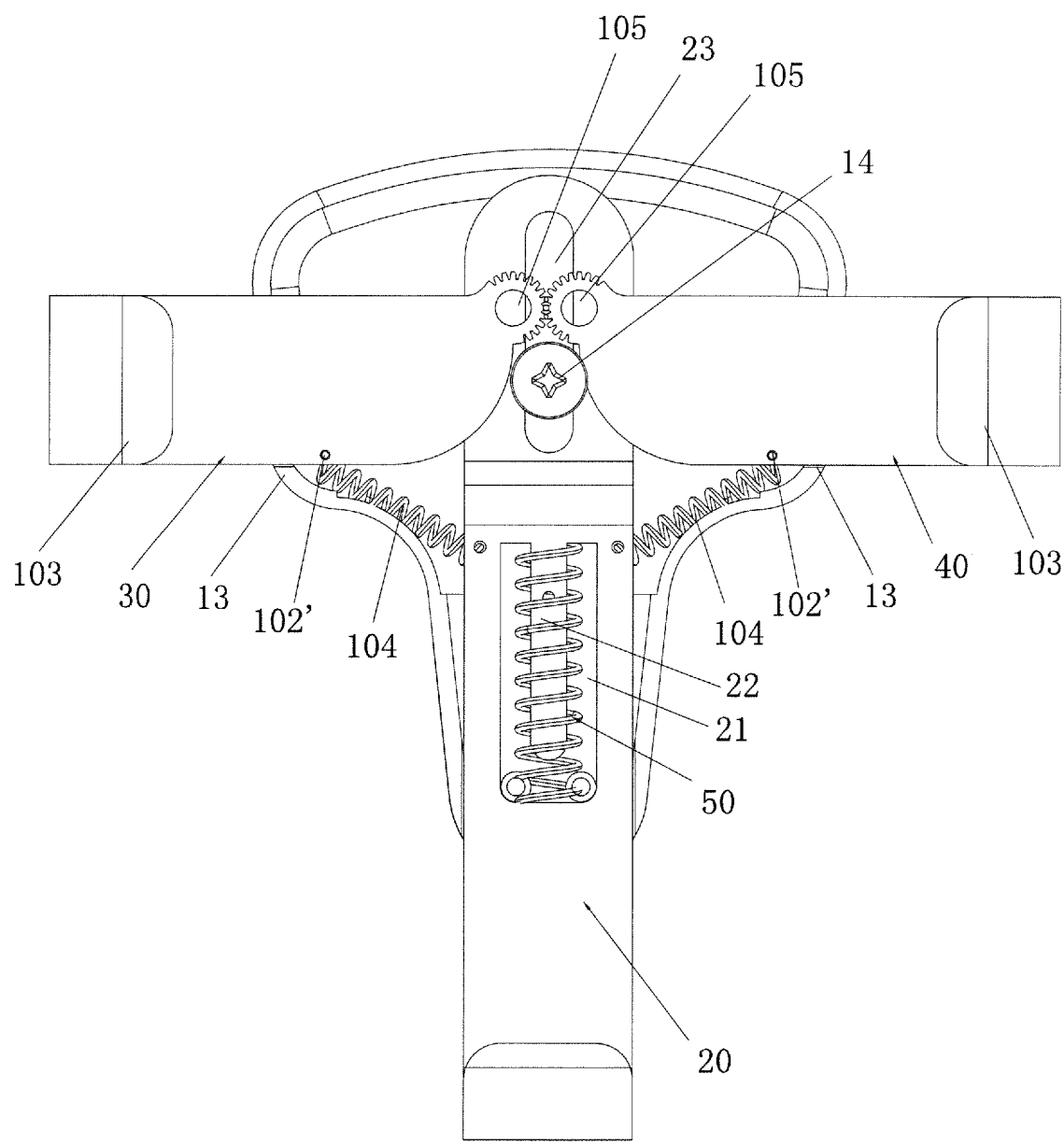
FIG. 4 is a partial schematic view according to a second embodiment of the present invention.
Figure 5:
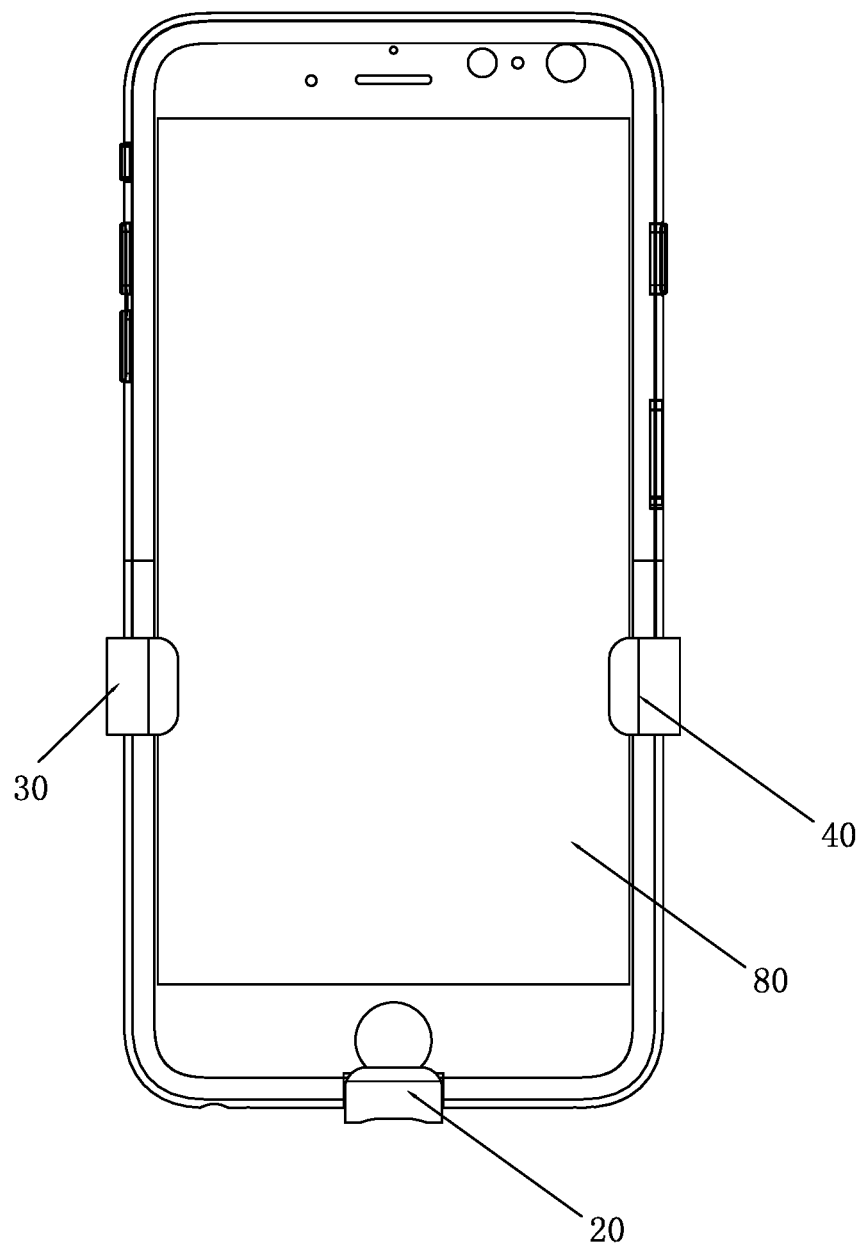
FIG. 5 is a schematic view according to the first embodiment of the present invention when in use.

FIG. 3 and FIG. 4 illustrate the main difference between a first embodiment and a second embodiment of the present invention.

As shown in FIG. 3, the link points 102 of the left holding arm 30 and the right holding arm 40 are overlapped. The bottom support arm 20 is connected with a movable pivot shaft 106. The link points 102 of the left holding arm 30 and the right holding arm 40 are first pivot holes 10'7. The movable pivot shaft 106 is inserted through the first pivot holes 10'7. The left and right rotation fulcrums 101 are fixed pivot shafts protruding forward from the rear base 10. The left holding arm 30 and the right holding arm 40 are formed with corresponding second pivot holes. The fixed pivot shafts are inserted in the corresponding second pivot holes. When the bottom support arm 20 is displaced downward, it will drive the link points 102 of the left holding arm 30 and the right holding arm 40 to move downward, meanwhile, the holding portions 103 of the left holding arm 30 and the right holding arm 40 rotate inward about the left and right rotation fulcrums 101 so as to clamp the mobile device.

As shown in FIG. 4, the left and right sides of the bottom support arm 20 are respectively connected with oblique tension springs 104 extending toward the link points 102' of the corresponding left holding arm 30 and the right holding arm 40. The upper ends of the oblique tension springs 104 are connected to the corresponding link points 102', respectively. The left holding arm 30 and the right holding arm 40 are respectively provided with gears 105 to mesh with each other. The gears 105 are located at the inner sides of the link points 102' of the left holding arm 30 and the right holding arm 40. The rotation fulcrums may be the lower limit surfaces 13 described below. When the bottom support arm 20 is displaced downward, the oblique tension springs 104 at both sides pull the left holding arm 30 and the right holding arm 40 to move downward. The left holding arm 30 and the right holding arm 40 rotate about the corresponding lower limit surfaces 13. (The lower limit surfaces 13 serve as the rotation fulcrums.) The holding portions 103 are rotated inward. The two gears 105 always mesh with each other, which facilitates the stable rotation of the left holding arm 30 and the right holding arm 40.

Certainly, for the first embodiment and the second embodiment shown in FIG. 3 or FIG. 4, a structure that facilitates the accuracy and the stability of the bottom support arm 20 to move up and down may be designed. For example, the bottom support arm 20 is provided with a stroke limit slot 23. The rear base 10 is provided with a limit post 14 projecting forward. The limit post 14 extends into the stroke limit slot 23. Due to the guiding and positioning of the limit post 14, the bottom support arm 20 is displaced up and down within the stroke limit slot 23.

A front of the rear base 10 is provided with a front cover 60. An accommodation room is formed between the front cover 60 and the rear base 10. The left holding arm 30, the right holding arm 40, the bottom support arm 20 and the return elastic member 50 are located in the accommodation room. A bottom, a left side and a right side of the accommodation room have openings to communicate with the outside, respectively. A left end of the left holding arm 30, a right end of the right holding arm 40, and a bottom end of the bottom support arm 20 extend outward from the corresponding openings, respectively. The openings at the left and right sides of the accommodation room each have an upper limit surface 12 and a lower limit surface 13 for limiting the displacement of the left holding arm 30 and the right holding arm 40. The positions of the upper limit surface 12 and the lower limit surface 13 are determined by the size of the mobile device, such as the mobile phone, for the left holding arm 30 and the right holding arm 40 to clamp the mobile device.

Figure 1:
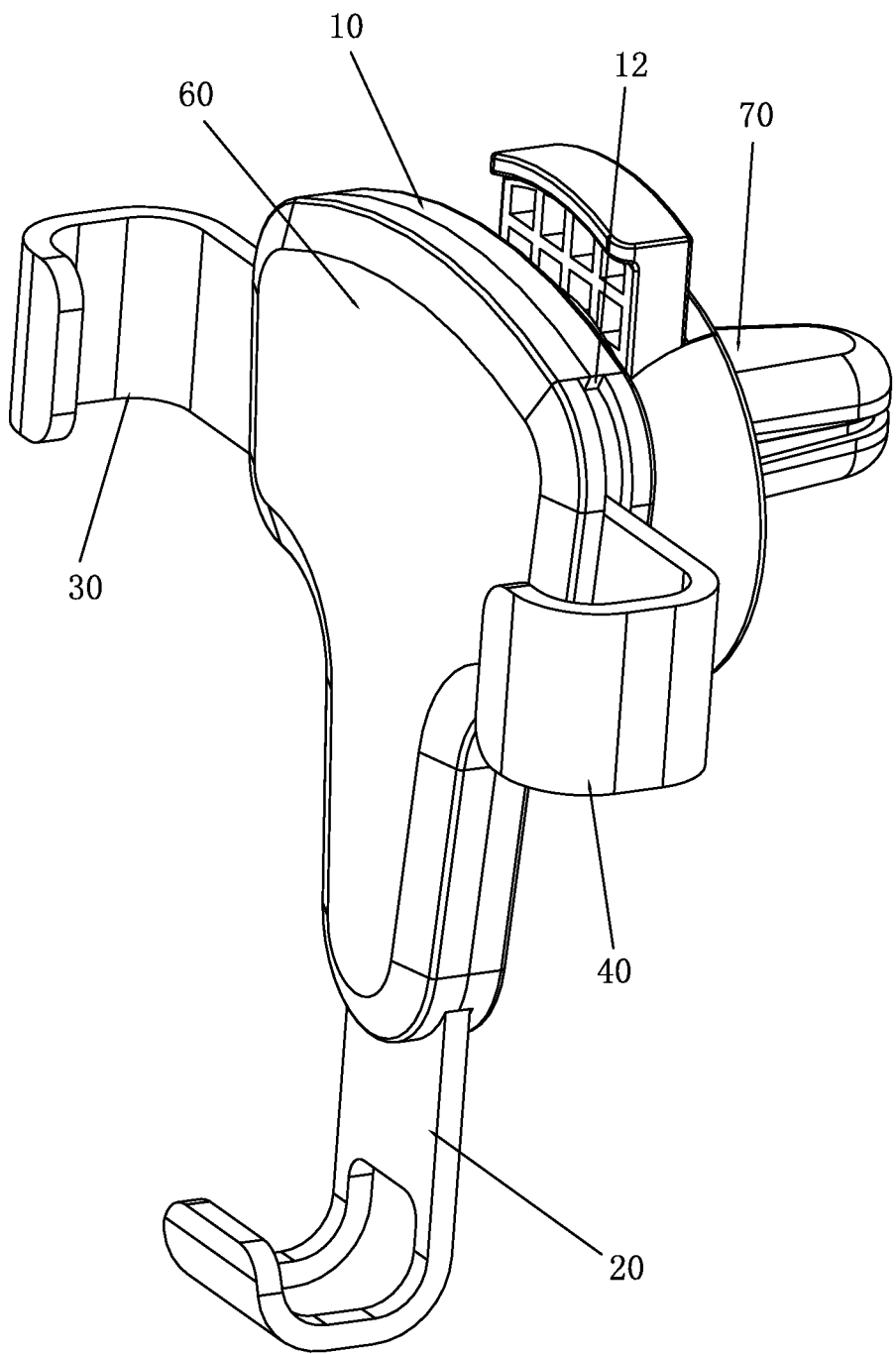
FIG. 1 is a perspective view according to a first embodiment of the present invention.
Figure 2:
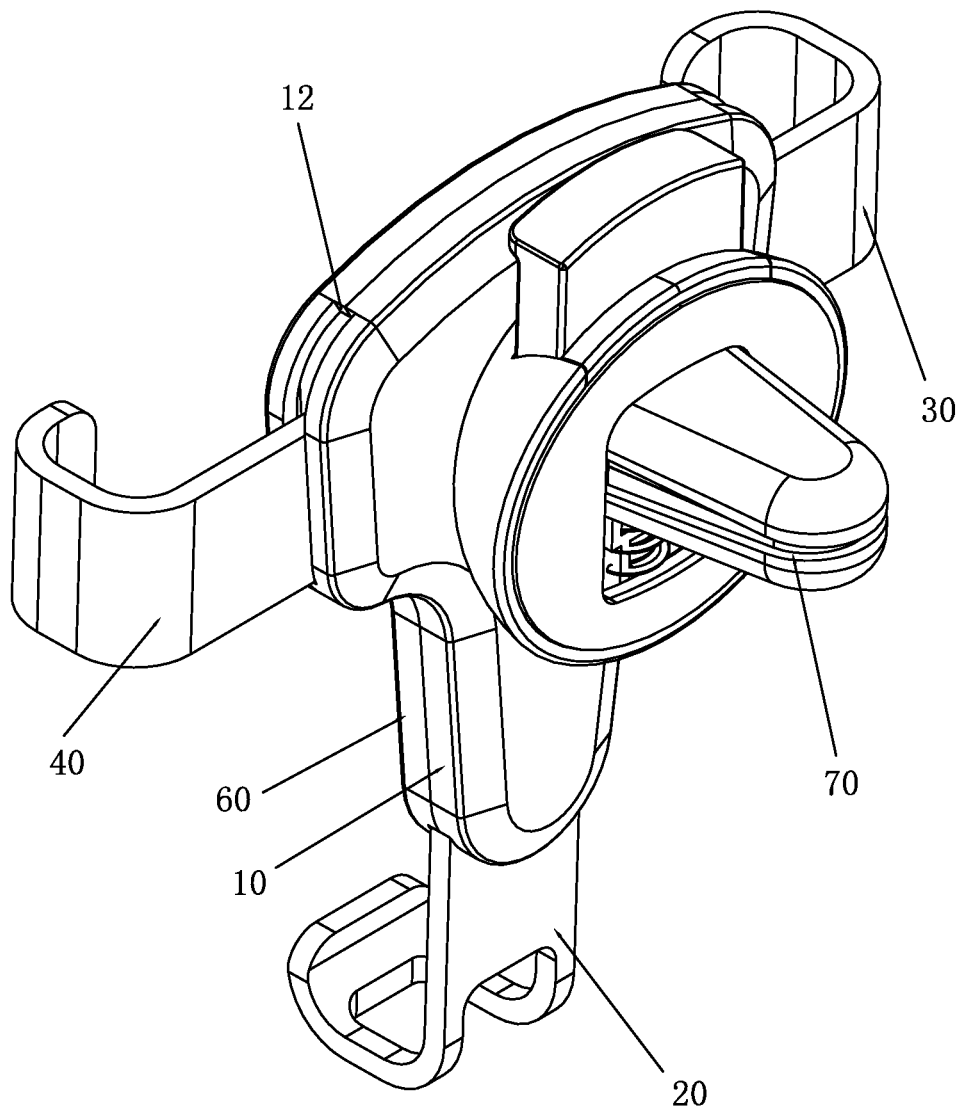
FIG. 2 is another perspective view according to the first embodiment of the present invention.

The back of the rear base 10 is provided with a mounting seat 70 for installing the fully-automatic rotary clamping holder. In general, a mobile phone holder is mounted to a vehicle by means of a sucking disc or fixed to the outlet of the air conditioner. The embodiment of FIGS. 1-3 illustrates a mounting seat to be fixed to the outlet of the air conditioner. However, this is not limited to the mounting structure. The clamping holder of the present invention may be applicable to a variety of mounting seats.

The feature of the present invention is the arrangement of the return elastic member, the link points of the left and right holding arms, and the rotation fulcrums. When the bottom support arm is moved downward by means of the weight of the mobile phone, the left and right holding arms are driven to rotate inward to form an automatic clamping. When the mobile phone is taken out, the return force of the return elastic member makes the bottom support arm move upward. The bottom support arm drives the left and right holding anus to rotate outward to form an automatic release. The clamping holder is especially suitable for automotive applications, user-friendly operation, easy to use, and practical. The clamping holder has a simple structure and a stable and reliable linkage, and is easy to produce and suitable for popularization and application.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. An articulated full-automatic rotary clamping holder, comprising a rear base, a bottom support arm, a left holding arm and a right holding arm, the bottom support arm, the left holding arm and the right holding arm being mounted to the rear base; the rear base being fixedly connected with a return elastic member extending vertically for returning the bottom support arm upward, one end of the return elastic member being fixed to the rear base, another end of the return elastic member being connected to the bottom support arm;

the bottom support arm being provided with left and right rotation fulcrums corresponding to the left holding arm and the right holding arm, the left holding arm and the right holding arm being formed with link points connected with the bottom support arm and driven by the bottom support arm, the left holding arm and the right holding arm having holding portions extending beyond the rear base;

the left and right rotation fulcrums being located between the corresponding holding portions and the link points; wherein when the bottom support arm is moved downward, the bottom support arm drives the holding portions to rotate inward to form an automatic clamping; wherein when the bottom support arm is returned upward, the bottom support arm drives the holding portions to rotate outward to form an automatic release.

2. The articulated full-automatic rotary clamping holder as claimed in claim 1, wherein the link points of the left holding arm and the right holding arm are overlapped, the bottom support arm is connected with a movable pivot shaft, the link points of the left holding arm and the right holding arm are first pivot holes, and the movable pivot shaft is inserted through the first pivot holes.

3. The articulated full-automatic rotary clamping holder as claimed in claim 2, wherein the left and right rotation fulcrums are fixed pivot shafts protruding forward from the rear base, the left holding arm and the right holding arm are formed with corresponding second pivot holes, and the fixed pivot shafts are inserted in the corresponding second pivot holes.

4. The articulated full-automatic rotary clamping holder as claimed in claim 1, wherein left and right sides of the bottom support arm are respectively connected with oblique tension springs extending toward the link points of the left holding arm and the right holding arm, and upper ends of the oblique tension springs are connected to the corresponding link points, respectively.

5. The articulated full-automatic rotary clamping holder as claimed in claim 4, wherein the left holding arm and the right holding arm are respectively provided with gears to mesh with each other, the gears are located at inner sides of the link points of the left holding arm and the right holding arm.

6. The articulated full-automatic rotary clamping holder as claimed in claim 1, wherein the return elastic member is a pressure elastic member; a lower end of the pressure elastic member is connected to the rear base, and an upper end of the pressure elastic member is connected to or leans against the bottom support arm.

7. The articulated full-automatic rotary clamping holder as claimed in claim 6, wherein the bottom support arm is provided with a vertical receiving groove, a top of the receiving groove is connected with a mounting post extending downward, the pressure elastic member is a pressure spring, the pressure spring is fitted on the mounting post; the rear base is provided with a guide post protruding forward, and the guide post extends into the receiving groove.

8. The articulated full-automatic rotary clamping holder as claimed in claim 1, wherein the return elastic member is one of a tension spring, an elastic rubber band and an elastic rubber strap, an upper end of the return elastic member is connected to the rear base, and a lower end of the return elastic member is connected to the bottom support arm.

9. The articulated full-automatic rotary clamping holder as claimed in claim 1, wherein a front of the rear base is provided with a front cover, an accommodation room is formed between the front cover and the rear base, the left holding arm, the right holding arm, the bottom support arm and the return elastic member are located in the accommodation room; a bottom, a left side and a right side of the accommodation room have openings respectively, a left end of the left holding arm, a right end of the right holding arm and a bottom end of the bottom support arm extend outward from the respective openings; and the openings at the left and right sides of the accommodation room each have an upper limit surface and a lower limit surface for limiting displacement of the left holding arm and the right holding arm.

10. The articulated full-automatic rotary clamping holder as claimed in claim 1, wherein a back of the rear base is provided with a mounting seat for mounting the full-automatic rotary clamping holder.

* * * * *